(12) United States Patent
Insana et al.

(10) Patent No.: US 8,980,456 B2
(45) Date of Patent: Mar. 17, 2015

(54) MODULE MOUNTING AND STRUCTURE WITH ADAPTOR PLATE

(71) Applicant: GM Global Technology Operations LLC, Detroit, MI (US)

(72) Inventors: Gary M. Insana, New Baltimore, MI (US); Andrew P. Oury, Troy, MI (US); Barton W. McLaughlin, Troy, MI (US); Kevin T. Joy, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 105 days.

(21) Appl. No.: 13/719,465

(22) Filed: Dec. 19, 2012

(65) Prior Publication Data

US 2013/0164577 A1 Jun. 27, 2013

Related U.S. Application Data

(60) Provisional application No. 61/579,204, filed on Dec. 22, 2011.

(51) Int. Cl.
*H01M 2/10* (2006.01)
*H01M 6/42* (2006.01)

(52) U.S. Cl.
CPC .............. *H01M 2/1077* (2013.01); *H01M 6/42* (2013.01)
USPC ........................................................ 429/72

(58) Field of Classification Search
CPC .......... H01M 10/5004; H01M 2/1077; H01M 10/5016
USPC ............................................................. 429/72
See application file for complete search history.

(56) References Cited

U.S. PATENT DOCUMENTS

| | | | | |
|---|---|---|---|---|
| 5,385,793 A | * | 1/1995 | Tiedemann et al. | 429/62 |
| 2009/0011326 A1 | * | 1/2009 | Wood et al. | 429/99 |

FOREIGN PATENT DOCUMENTS

| | | |
|---|---|---|
| DE | 11 2007 002 525 T5 | 9/2009 |
| DE | 10 2009 005 124 A1 | 7/2010 |
| DE | 10 2010 035 114 A1 | 4/2011 |

* cited by examiner

*Primary Examiner* — Stewart Fraser
*Assistant Examiner* — Olatunji Godo
(74) *Attorney, Agent, or Firm* — Dinsmore & Shohl LLP

(57) ABSTRACT

A modular battery pack and method of making a battery pack. The modular structure includes an open box with an interlocking features to allow for flexibility in assembly of numerous battery pack configurations. The design is such that numerous sub-module assemblies are formed that can be fastened, connected or otherwise secured to a tray, frame or other underlying primary support structure. Aligned stacks of individual battery cells can be placed within the volume defined within the box-like structure so that portions of the box-like structure move in response to a spring-like force imparted by the stack of battery cells. Adapter plates facilitate the modular construction by an interlocking connection between the box-like structure and the underlying support structure.

9 Claims, 7 Drawing Sheets

MODULE MOUNTING AND STRUCTURE WITH ADAPTOR PLATE

This application claims priority to U.S. Provisional Application 61/579,204, filed Dec. 22, 2011.

BACKGROUND OF THE INVENTION

This invention relates generally to a mounting strategy for batteries, and more particularly to using such a strategy for various battery modular configurations where the batteries are used to generate motive power for vehicular and related transportation applications.

Various batteries, including lithium-ion, lead acid and nickel-metal hydride variants, may be configured to supplement or supplant conventional internal combustion engines (ICEs) for automotive and related transportation applications. The ability to passively store energy from stationary and portable sources, as well as from recaptured kinetic energy provided by the vehicle and its components, makes batteries (in general) and rechargeable batteries (in particular) ideal to serve as part of a propulsion system for cars, trucks, buses, motorcycles and related vehicular platforms. In one form suitable for automotive applications, the batteries are shaped as a generally thin rectangular cell with positive and negative voltage terminals emanating therefrom; several such batteries may typically be combined into larger assemblies—including modules that in turn can be formed into a complete system known as a battery pack—to generate the desired power output.

Current modules for holding, mounting or otherwise securing battery cells require numerous components, as well as complicated manufacturing processes to ensure such proper mounting. involving laser welding, spot welding, high part-count fasteners or the like. In the case of welding, such processes involve excessive temperatures, weld flash and related undesirable side effects. Furthermore, the use of compression limiters (along with their associated tie rods) along the stacking dimension of numerous battery cells into a larger battery module may produce tolerance problems during such stacking. Because the compression limiters tend to be made in large batches—where the dimensional consistency from one batch to another may be subject to fairly high tolerances—the stacking of such limiters (which individually may be acceptable) could, upon considering the multiplying effect of placing numerous such limiters into a module, produce unacceptable component size mismatches. Eccentricities in the bores formed in the compression limiters may exacerbate assembly problems, as the tie rods may be intolerant of a misaligned stack of apertures. Other components, such as compression bands (while helpful in ensuring proper dimensions of an assembled stack) and hold-down rails (helpful in providing discrete support of the assembled module onto a tray), introduce increases in overall part count, as well as reduce the overall modularity of the battery system. It is difficult to reconcile different vehicle platforms (where vehicular size, shape and power outputs or battery pack configurations dictate the final configuration of the battery pack) with production and inventory techniques such as those mentioned above, and an attempt to accommodate such a variety of configurations makes an approach based on the above inefficient and expensive.

It would be advantageous to have a modular mounting or attachment approach that accommodates number battery pack sizes and configurations.

SUMMARY OF THE INVENTION

In accordance with the teachings of the present invention, a modular design for securing one or more batteries (i.e., battery cells) into a larger battery assembly (such as a battery module or a battery pack) is disclosed. The design is such that numerous sub-module assemblies are formed that can be fastened, connected or otherwise secured to a tray, frame or other underlying primary support structure. Each of the sub-module assemblies may define an open box made up of two opposing brackets along one axis and two opposing end plates along an orthogonal axis. The box-like structure can be placed on or with the primary support structure in a modular fashion to permit as many battery cells in modular form as needed. Aligned stacks of individual battery cells (that resemble, for example, a stacked deck of playing cards) can be placed within the volume defined within the box-like structure so that the end plates may move along an axis that is substantially normal to theirs (as well as the stacked cells) respective planar dimensions. In this way, at least the corresponding dimension of the box-like structure may move in response to a spring-like force imparted to the end plates by the stack of batteries. Adapter plates facilitate the modular construction by (in one form) including an interlocking connection with the box formed by the brackets and end plates; the construction of the adapter plates promotes an easy and variable attachment to the underlying support structure. This in turn allows for a number of battery pack integrations and variations, especially as they relate to the increased use of common parts in multiple packaging configurations where different numbers of individual batteries may be used to form battery packs of different sizes, shapes, outputs or the like. Such an adaptable configuration is more robust than that used in hoop and compression limiter designs.

In the present context, the battery pack is considered to be a substantially complete assembly or system of components necessary for propulsion of the vehicle for which the pack was designed, while battery modules and individual battery cells are (as mentioned above) considered to be subcomponents of the overall system Likewise, an assembly of components for a battery pack used for vehicular applications may include—in addition to numerous battery cells—cooling plates, frames, trays, securing mechanisms and other equipment that, while not contributing to the production of electric power, form an important part of the overall battery system nonetheless. Traditionally, all of these components are stacked and joined together in such a way that weight, cost and complexity are increased. By way of example, the frames alone may be as much as 10% of the total weight of the overall battery pack assembly or system. A further difficulty is that the equipment and fabrication techniques used in such a system do not lend themselves to the formation of modular assemblies that can be modified depending on the particular power needs or layout of the vehicle.

According to another aspect of the invention, an automotive battery pack including battery cells, a primary support structure and at least one modular assembly is disclosed. Each modular assembly includes brackets spaced apart from one another along a bracket axis and end plates arranged along an end plate axis such that together, the end plates and the brackets define a box-like structure. The battery cells are either stacked or able to be stacked; in either way, upon placement of the stacked battery cells in the volume defined by the box-like structure, at least one of the end plates can be moved along the end plate axis that is formed along the stacked dimension of the battery cells that is generally orthogonal to the bracket axis. The connection of the adjacent edges of the end plates and brackets is such that a gap or related additional space is formed. One or more adapter plates are also included to provide a secure connection of the modular assembly to the primary support structure via one or more of the brackets.

Additional equipment may also be present, including cooling conduit (also referred to herein as heat exchange conduit) to promote heat delivery to or heat removal from the various battery cells. In a particular form, the battery pack is shaped to provide a substantially conformal fit within a corresponding part of a vehicle. As discussed in conjunction with the previous aspect, the brackets define a channel to provide a gap and promote the connection with the end plates.

According to yet another aspect of the invention, a method of assembling an automotive battery pack is disclosed. The method includes arranging one or more modular assemblies (such as the aforementioned sub-modules) into generally box-like structures that can expand along one or more dimensions of the box. In this way, each sub-module can accept numerous battery cells that are under a certain amount of compression (although not so much that damage to the structure of any of the battery cells results) such that the stacked cells exert an outward-pushing force along their stacked dimension. As discussed above, the fit between the adjacent plates, brackets or related structure that forms the walls of the box-like structure is such that it permits the relative movement of the end plates relative to the brackets, while the construction of the adapter plates is such that the size, placement or number of modular assemblies may be tailored to coincide with the power, size or shape requirements of the vehicle into which the battery pack is placed.

BRIEF DESCRIPTION OF THE DRAWINGS

The following detailed description of the preferred embodiments of the present invention can be best understood when read in conjunction with the following drawings, where like structure is indicated with like reference numerals and in which.

DETAILED DESCRIPTION

Figure 1:
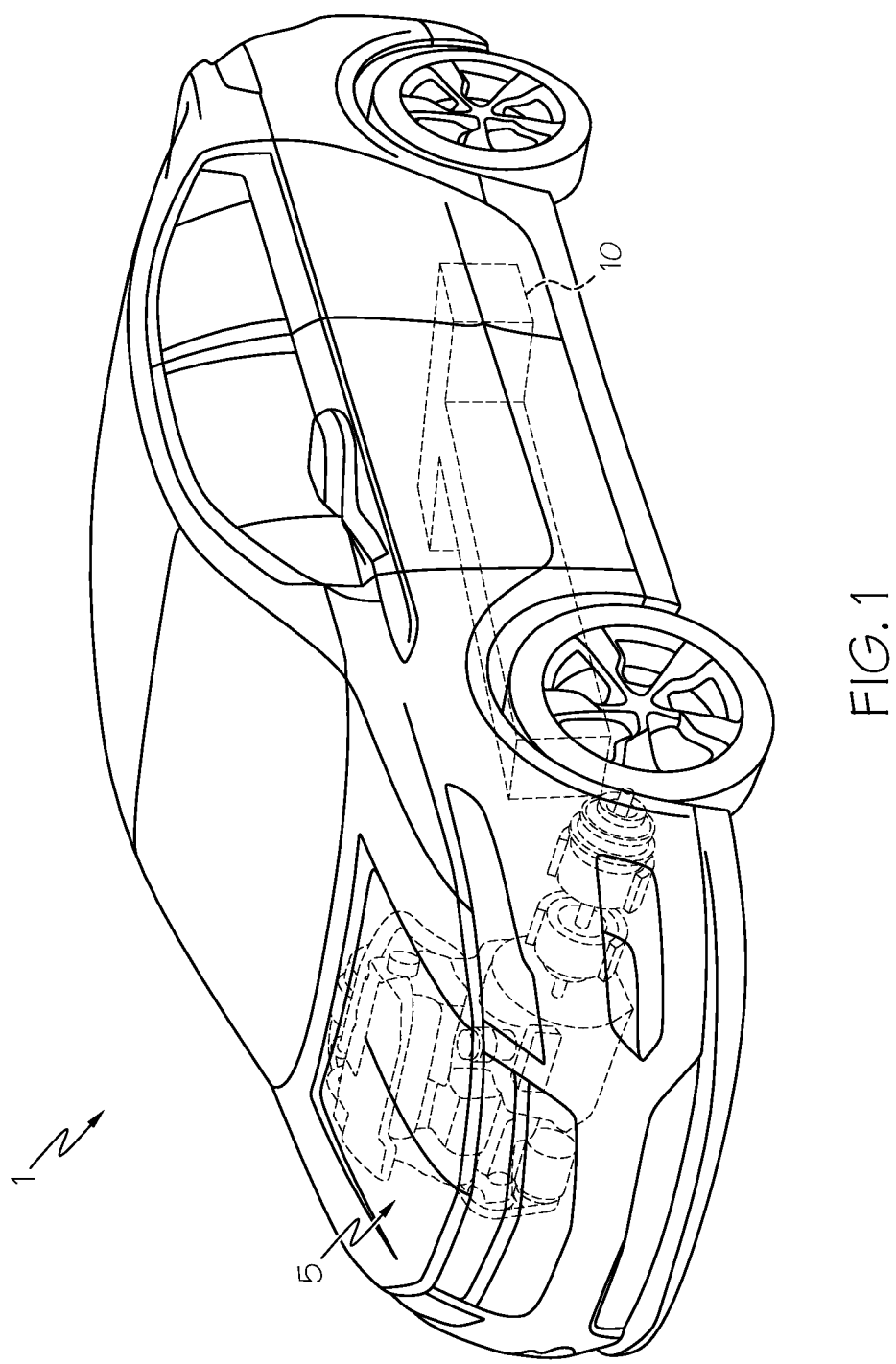
FIG. 1 shows a vehicle with a hybrid propulsion system in the form of a battery pack and an internal combustion engine.
Figure 2A:
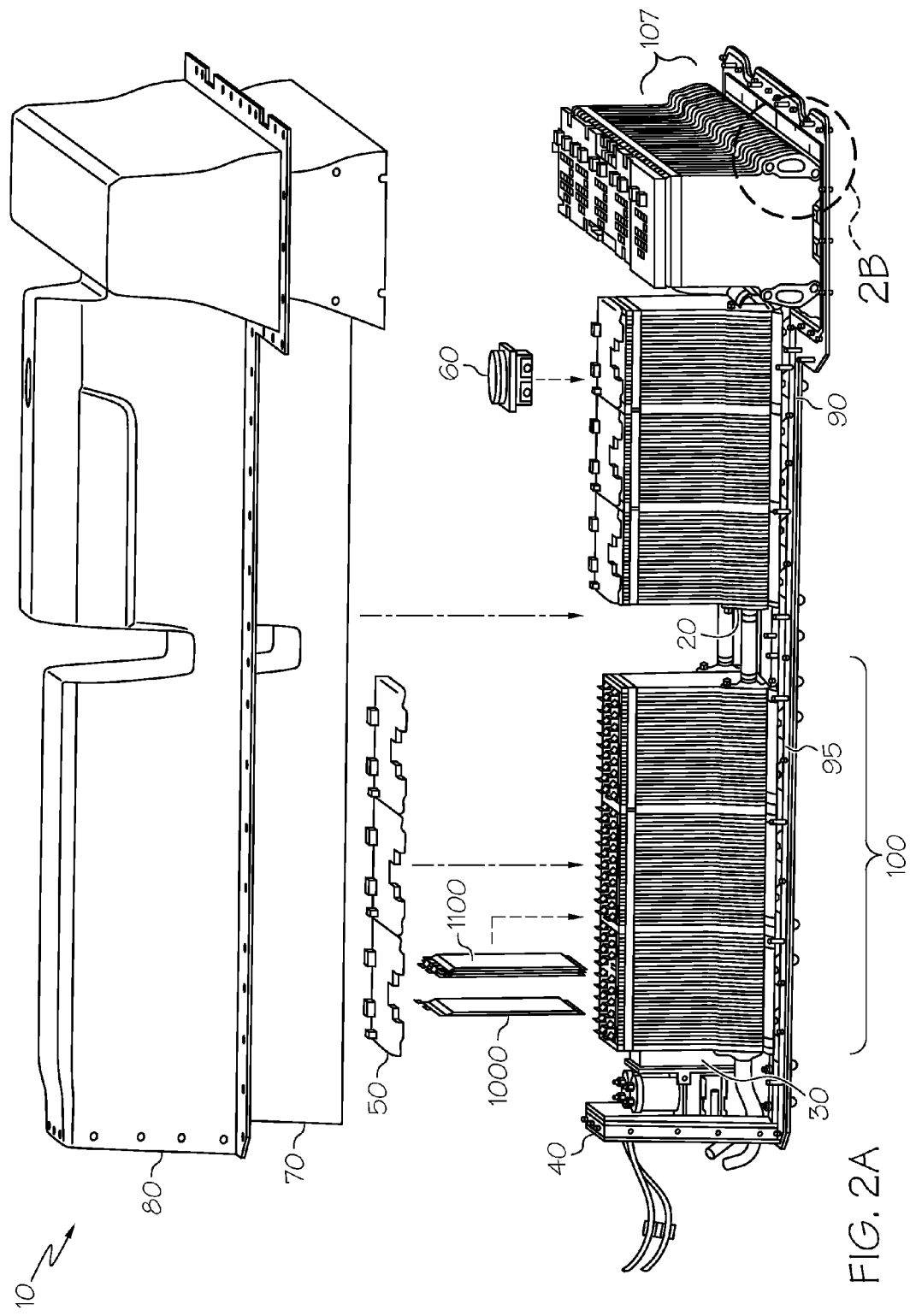
FIG. 2A shows details associated with the battery pack.
Figure 2B:
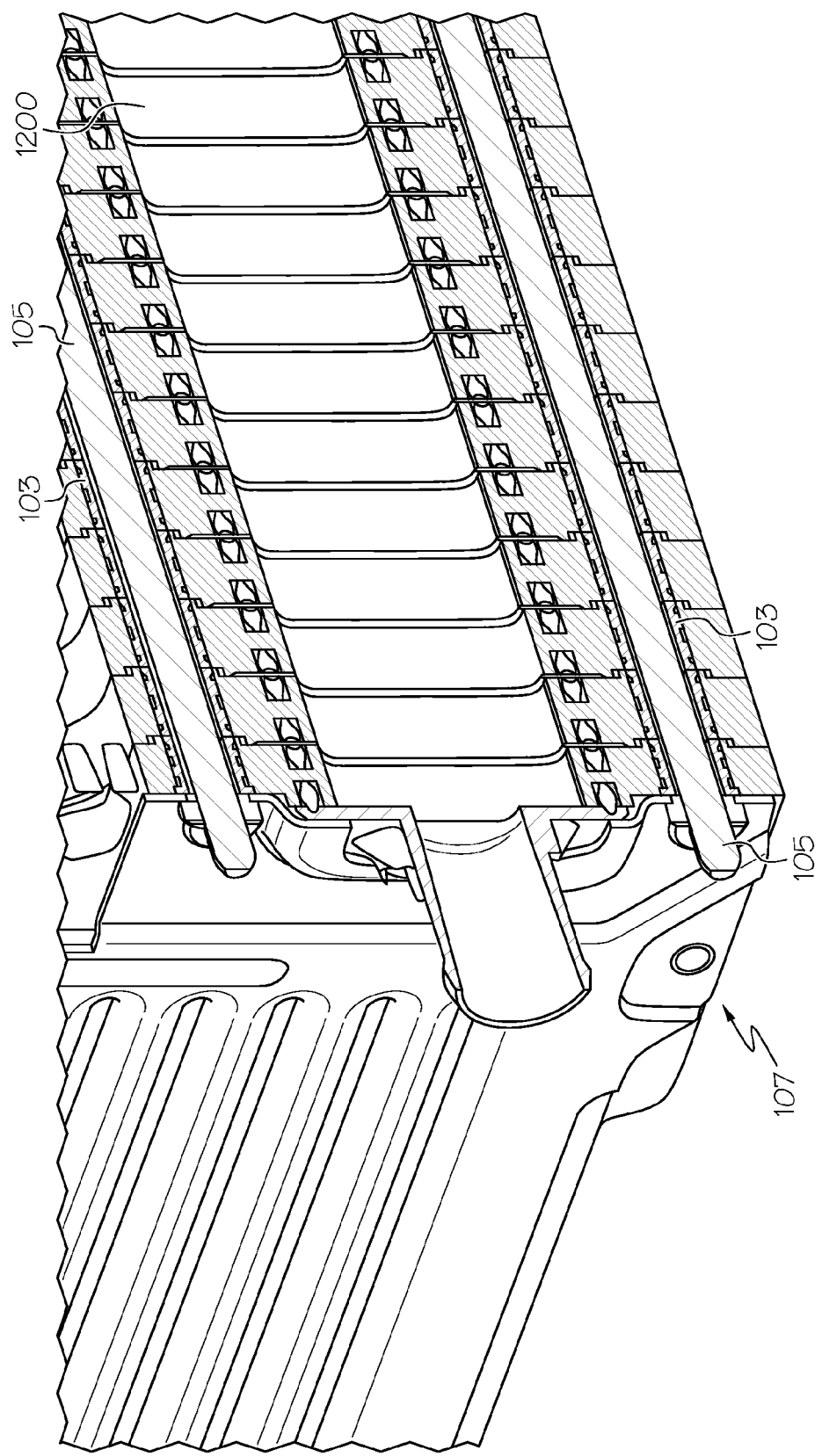
FIG. 2B shows a detailed view of a representative stack of individual battery cells highlighting the placement of compression limiters as a way to assemble such a stack according to the prior art.

Referring first to FIGS. 1, 2A and 2B, a vehicle 1 includes a hybrid propulsion system in the form of an electric power source made up of a conventional ICE 5 and a battery pack 10. Such a vehicle is known as a hybrid electric vehicle (HEV). It will be appreciated by those skilled in the art that vehicle 1 may not require an ICE 5, in such case, rather than being an HEV, it is an electric vehicle (EV); either form is within the scope of the present invention. Additional drivetrain components (none of which are shown) useful in providing propulsive power to one or more of the wheels and coupled to one or both of the battery pack 10 and ICE 5 are understood to include electric motors, rotating shafts, axles, transmission, controllers or the like. While vehicle 1 is presently shown as a car, the applicability of the hybrid propulsion system to other such automotive forms (including trucks, buses, aircraft, watercraft, spacecraft and motorcycles) is deemed to be within the scope of the present invention.

As shown with particularity in FIG. 2A, the battery pack 10 is made up of numerous battery modules 100 that in turn are made up of individual battery cells 1000, companion cooling plates 1100 and (as shown with particularity in FIG. 2B) a frame 1200 used to provide structural support. Adjacent individual cells 1000 (which in one form are shaped into generally planar rectangular members) may be stacked such that they (as well as the interspersed cooling plates 1100) may face one another as shown. In one typical example, the battery pack 10 may be made up of between about two hundred and three hundred cells 1000, although it will be appreciated by those skilled in the art that additional or fewer cells 1000 may be needed, depending on the power requirements of vehicle 1. In one commercial embodiment employed by the Assignee of the present invention, the numerous individual battery cells 1000 are arranged in a combination of serial and parallel connections into nine modules 100 that are arranged in the repeating array as shown to define the generally T-shaped pack 10. Additional components of battery pack 10 may include coolant delivery conduit 20 (which may be fluidly cooperative with cooling plates 1100 to facilitate the delivery of a coolant (not shown) between the individual battery cells 1000 and a radiator or related heat exchanger (neither of which are shown)), an electronic control unit 30, bulkhead 40, battery interface units 50, manual service disconnect plug 60, insulation 70 and cover 80 to provide other operational features of battery pack 10. All of the components mentioned above include undergirding structural support in the form of battery pack tray (also called module tray) 90, which additionally may include features to enhance vehicular crashworthiness and other support functions. Hold-down rails 95 are used to clamp a protruding surface of the support frame such that the modules 100 don't move relative to tray 90 that provides the primary support structure for the individual cells 1000, modules 100 and other parts of the assembled battery pack 10. Thus, in one form, tray 90 can provide the support structure of the battery pack such that one or more of the box-like structures that define the shape of the sub-modules can be secured to it. In one preferred form, the securing of the sub-module 110 to the tray 90 is such that it avoids complicated manufacturing processes, such as those involving forming the cage-like structure of the module 100, as well as those associated with securing the modules 100 to the tray 90. In a preferred embodiment, the vehicle 1 defines either a body-on-frame construction or a unibody construction; in either configuration, the battery pack 10 of the present invention is shaped to provide a substantially conformal fit within at least one of an automotive body, frame or unibody platform. Such a substantially conformal fit is preferably due to comparable shapes of the outer dimension of the battery pack 10 and complimentary shape in the portion of the body, frame or unibody structure that is designed to form around the battery pack 10.

Referring with particularity to FIG. 2B, a partial cutaway view shows the various compression limiters 103, tie rods 105 and supporting flanges or bulkheads 107 (with apertures formed therein for the tie rods 105 and coolant channels) that are used to keep the compression limiters 103 of the prior art properly aligned and stacked. As can be seen, the size and placement of the apertures in the flanges or bulkheads 107 is such that misalignment along the length of the stack is possible unless they are kept to a very tight tolerance. Likewise, the dimensions of the compression limiters 103 along the stacked dimension are such that compressibility and subsequent containment of the stacked fuel cells (not presently shown but represented individually by corresponding frames 1200) could be adversely impacted.

Figure 3:
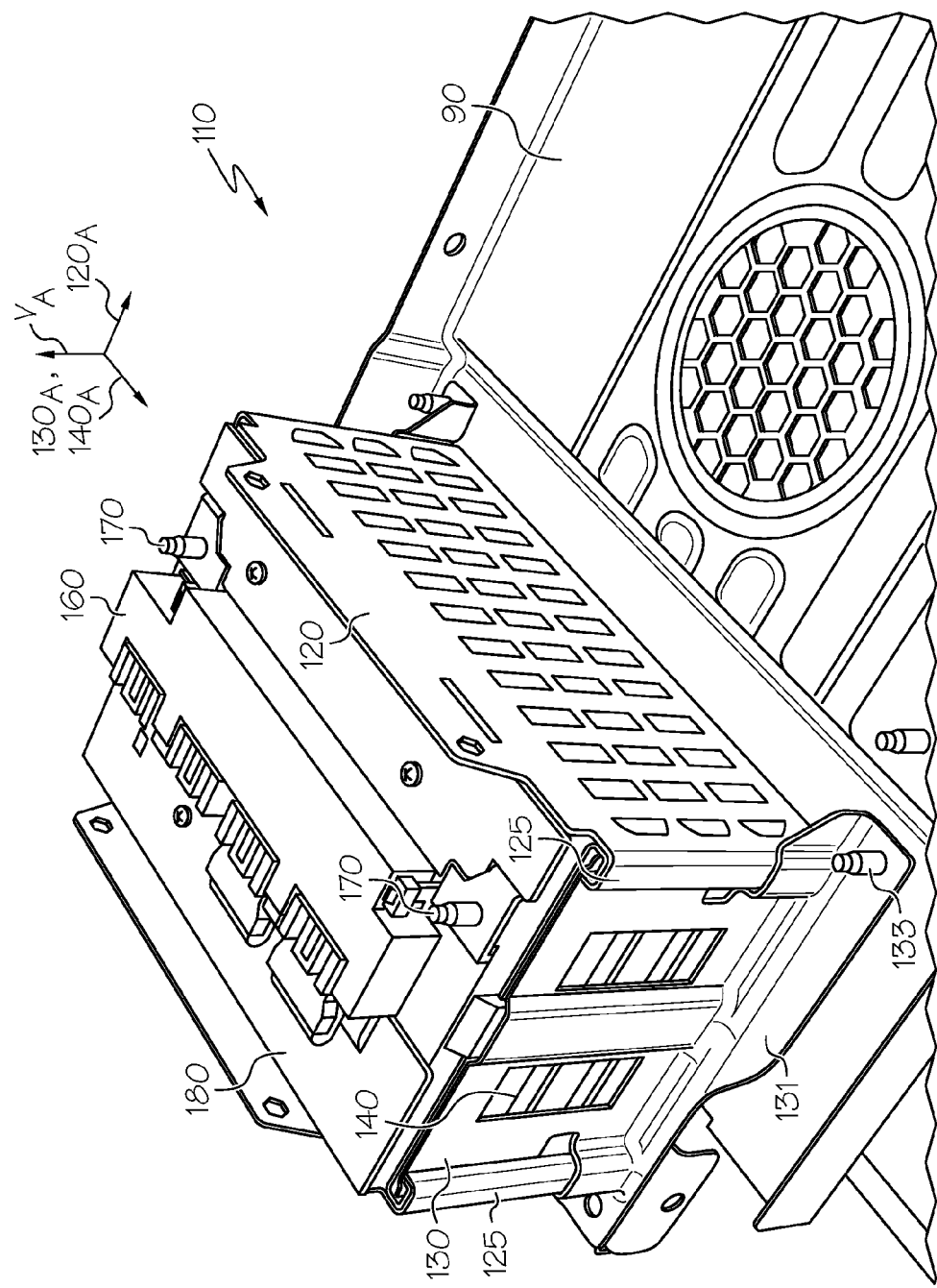
FIG. 3 shows a single battery sub-module according to an aspect of the present invention.

Referring next to FIG. 3, a generally box-shaped cell sub-module 110 is shown (with a group of aligned and stacked battery cells nested therein) resting upon and being connected to tray 90; this sub-module 110 includes a generally U-shaped module cage 115 that defines a pair of generally planar upstanding perforate brackets 120 spaced apart by a generally planar base 122 such that the brackets 120 face each other. A pair of slidably-insertable planar end plates 140 can fit within a channel 125 formed by a curvature in the ends of the brackets 120. The interlocking curls formed by cooperation of the channel 125 and the edges of the generally planar construction of the end plates 140 allows the formation of the box-like structure without the need for welding or fasteners. Furthermore, the size of the channel 125 is such that a gap 135 is formed that permits a relatively loose fit of the end plate 140 within the brackets 120. This is beneficial in that it can accommodate a spring-like loading of an aligned stack of individual battery cells 1000 (as discussed in more detail below) to ensure a secure fit of cells 1000 within the box-like shape of the sub-module 110. Thus, the cooperation of the end plate 140 may be placed in an adjacently-faced relationship relative to the adapter plate 130 such that upon placement of numerous battery cells within the box-like structure of cell sub-module 110, the lateral edges of the stacked cells (not presently shown in FIG. 3) substantially align along the inward-facing surface of the corresponding end plate 140. In one embodiment, one or both of the end plates 140 and the brackets 20 may have tapered edges to promote an interface that locks together in a manner similar to that of a tapered ball joint design.

Figure 6:
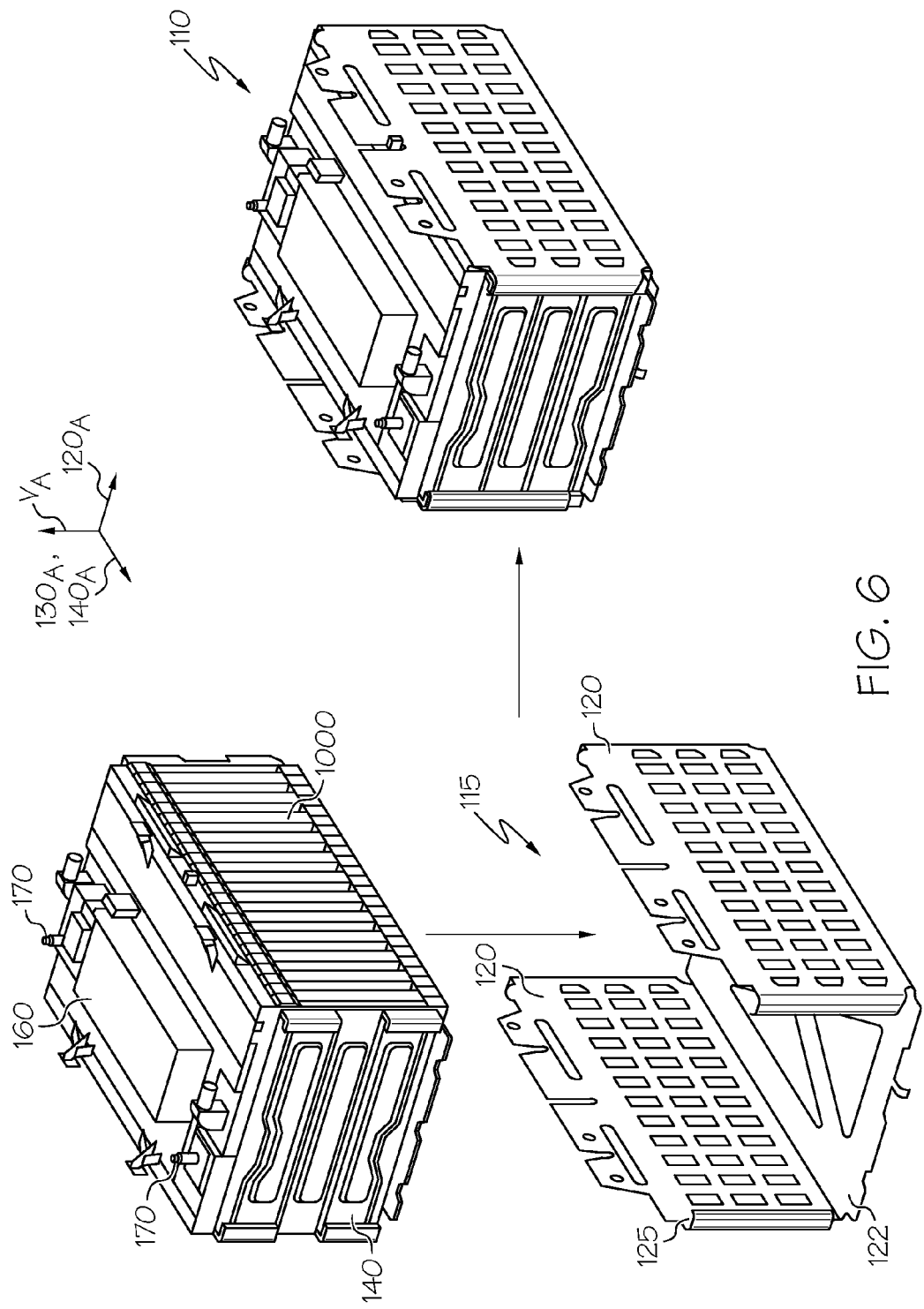
FIG. 6 shows the respective placement of a 12-cell stack into a module cage and then compressed into a module through the cooperation of the cage and end plates.

Adapter plates 130 (which in one preferred form are also of a generally planar construction) may be placed in an adjacently-faced relationship relative to the end plates 140. In fact, the end plates 140 are designed to accept a number of adaptor plates 130 which can additionally be bolted down directly to the tray 90. Moreover (as will be discussed in more detail below), these adapter plates 130 can lock two adjoining battery modules together side-to-side or end-to-end. The adapter plates 130 can be combined with features of other pack components, such as a mounting location for a manual service disconnect (not shown). The adapter plate 130 includes unitarily-formed mounting footers 131 as flanged sections to allow a threaded, bolted or related attachment 133 between the cell sub-module 110 and the underlying battery pack tray 90. Although the present adapter plate 130 is shown with bottom corner mounting locations, it will be appreciated by those skilled in the art that other configurations, such as top flanges with bolt holes formed at end or side locations relative to the box-like structure of sub-module 110 (neither of which are shown) are also within the scope of the present invention. Suffice to state that one of the salient attributes of adapter plate 130 is that its flanged and apertured attachment configuration is of a substantially unitary construction with mounting points sufficient to accommodate complementary locations with tray 90 or other battery pack structure, thereby facilitating a more modular construction than if bound by limited attachment locations. Significantly, the flanged footers 131 permit substantial continuity of attachment of the sub-module 110 to the underlying tray 90. Upon assembly, a Cartesean coordinate axis defines the three generally orthogonal axes that correspond to a bracket axis 120$_A$, an adapter plate axis 130$_A$ (which coincides with an end plate axis 140$_A$ as shown in FIG. 6) and a vertical axis V$_A$. As can be seen, each axis defines a linear dimension that extends in a direction that is substantially normal to the planar dimensions of their respective brackets or plates.

Figure 4:
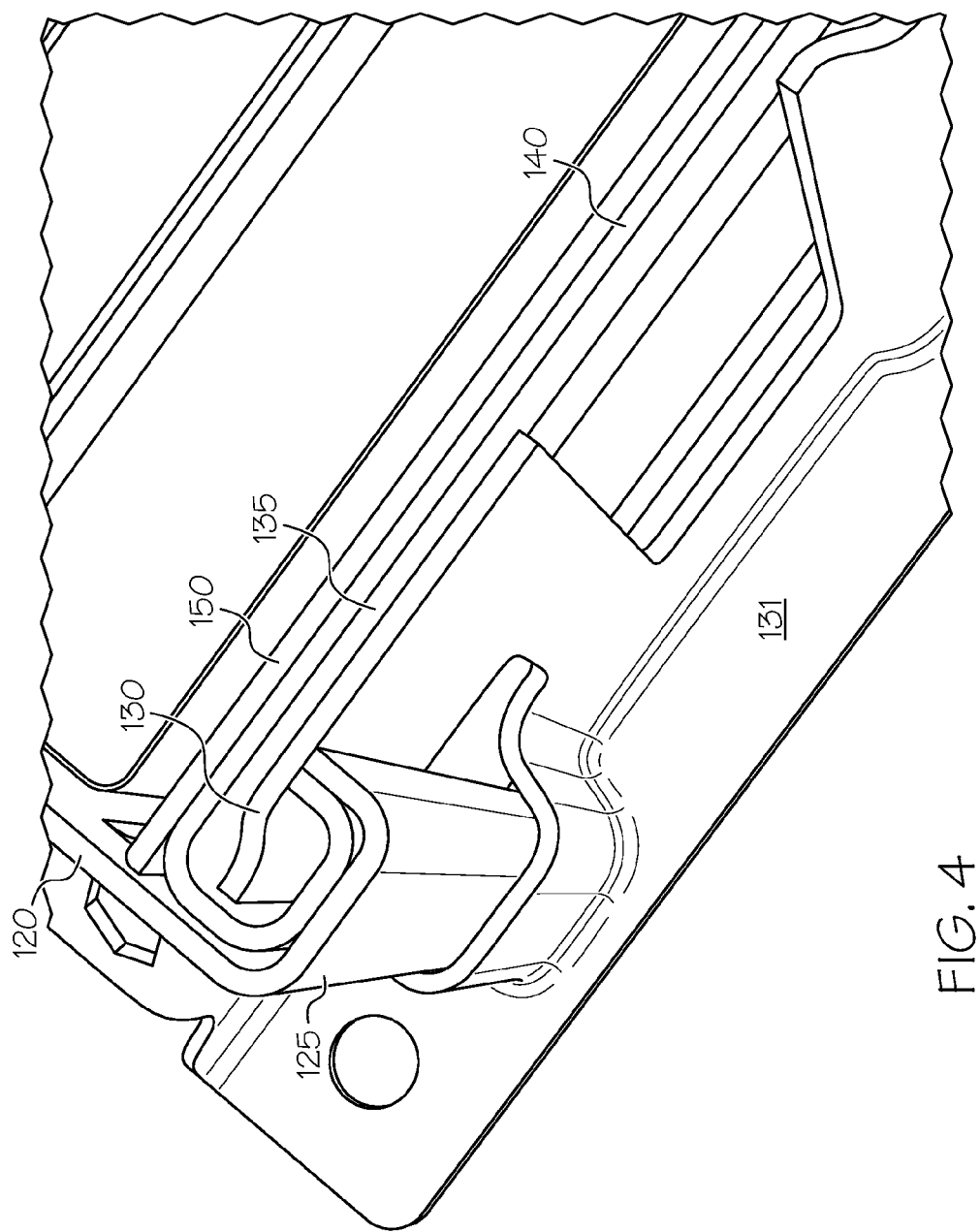
FIG. 4 shows a more detailed view of the connection of an adapter plate, bracket and end plate according to an aspect of the present invention.

Referring next to FIG. 4 in conjunction with FIG. 3, as with the relationship between the brackets 120 and the end plates 140, there is a nested arrangement of the generally planar edge of the adapter plate 130 within the C-shaped channel 125 formed in the end of the bracket 120. The adapter plate 130, bracket 120 and module end plate 140 are shown in more detail in their assembled form, where the battery pack tray 90 of FIG. 3 has been removed from the present figure for viewing clarity. In one form, numerous individual generally rectangular, planar cells and cooling plates (neither of which are shown) are stacked within the assembled module sub-module 110; in the process, they are compressed along their stacked dimension, after which the stack of cells and cooling plates is allowed to expand. This expansion presses against the adjacent face of the end plate 140, causing it to more securely cooperate with bracket 120. An additional flat plate 150 is optionally present as a cooling plate which—in this configuration—is placed between the end plate 140 and the cells (not presently shown). As shown in the figure, the lateral edges of the end plates 140 may also be formed into a generally C-shaped channel such that the C-shaped portion of each end plate 140 may nest inside the C-shaped portion of the adjoining bracket 120. Once the end plate 140 is in place, the adapter plate 130 may then be slid down into the channel 125. The top-down slidable engagement of the adapter plates 130 within the channel 125 permits the stacked sequence of numerous individual cells to be secured or otherwise attached to the tray 90. Other components of the sub-module 110, including cell monitoring electronics 160, positive and negative terminals 170 and sub-module cover 180 are shown in FIG. 3 as being contained within the sub-module 110. In configurations where top flanges (similar to flanged footers 131) are employed, battery cell sub-modules 110 may be placed in a vertically-stacked arrangement, thereby further contributing to the flexibility of the battery packs to fit within a particular vehicle configuration.

Referring next to FIG. 6, a group of twelve individual cells 1000 are stacked—along with end plates 140 and the top section defined by the battery interface unit 160 that includes (among other things) positive and negative battery terminals 170—into the spaced brackets 120 to form the box-like structure of the sub-module 110. The combined effect of the brackets 120 and the end plates 140 is that the cage 115 that is formed into the box-like structure holds the end plates 140 and the stacked cells in compression, while the end plates 140 hold in the sides of the cage 115 that extend along the stacked axis of the cells. In general, the cells 1000 are stacked in a face-to-face relationship such that their edges substantially align to define a generally rectangular shape. End plates 140 are added to the opposing ends of the stacked cells 1000, while the battery interface unit 160 is mounted at the top so that three of the six sides of the sub-module 110 are in place. The slightly compressive properties of the cells 1000 tend to push along the end plate axis 140$_A$ so that the end plates 140 are likewise pushed outward. This subassembly is then lowered into the spaced defined by cage 115 so that once engaged, the edges of the end plates 140 are slid into the channels 125 of the brackets 120. As mentioned above, the gaps present within the channels 125 permit a certain amount of movement in order to accommodate the compressive forces exerted by the stacked cells 1000 on the end plates 140. At As assembled, the sub-modules 110 define all six sides of the box-like structure to provide containment and support for the numerous individual battery cells 1000 that are in turn supported by tray 90. Upon inclusion of one or more adapter plates (not presently shown) along one of the various mounting locations on tray 90, the sub-modules 110 may be arranged such that they make up the modules 100 that are shown in FIG. 2A.

Figure 5:
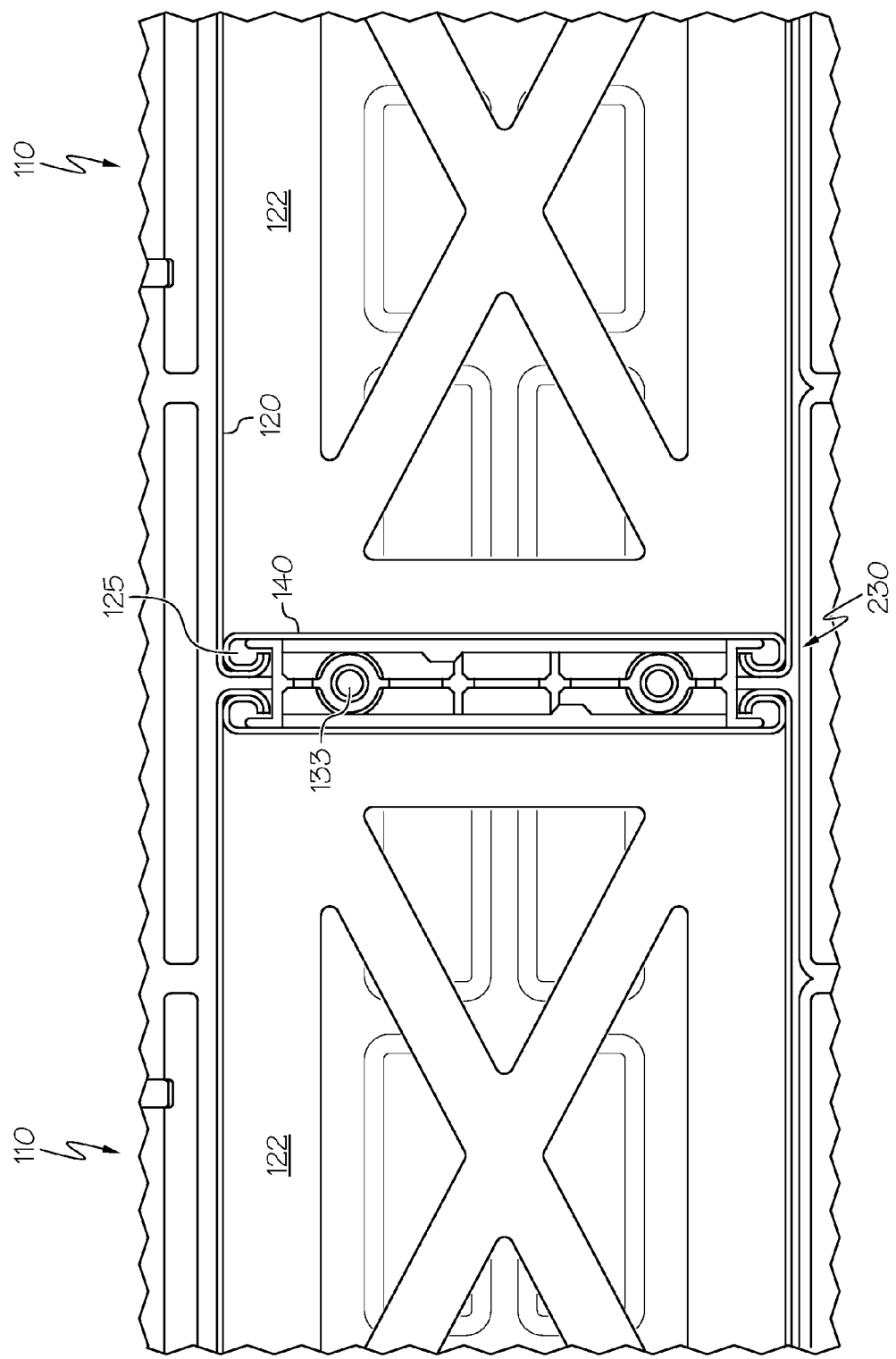
FIG. 5 shows a pair of adjacent battery sub-modules secured to one another through a minimum-width center plate.

Referring next to FIG. 5, an interlocking adapter plate (now called a center plate) 230 can be designed such that it can lock two sub-modules 110 together side-to-side or end-to-end. The interlocking adapter plate 230 interfaces the bracket 120 in a manner generally similar to that of the module end plate 140 and the interlocking adapter plate 130, but is designed to interface two sub-modules 110 in this manner at the same time. This promotes a minimum-width to accommodate dimensional variations, as well as the diameter of the fastener used between the adjacent sub-modules 110. The end plates 140 can be combined with features of other components, such as a mounting location for a manual service disconnect. Moreover, the end plates 140 can be designed to accommodate additional battery pack configurations not shown in the figures. The center plate configuration between two adjacent sub-modules 110 not only reduces the overall assembly footprint by reducing the distance between adjoining sub-modules 110, but also can double on some of the ends as a close-out plate at the end of a battery pack. This is the case regardless of whether the adapter plates 130 or center plates 230 are configured for bottom (i.e., tray 90) securing (such as that through the aforementioned bolted relationship) or top securing (which would be especially useful in stacked module configurations).

Although not shown, the modular nature of the sub-module construction is such that the adapter plates not only promote flexibility in tray mounting and module stacking options as a way to accommodate various vehicular power and shape configurations, they also have the effect of further reducing part count by removing the need for an end plate on the closed-out end of the battery pack 10.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, terms such as "substantially" are utilized to represent the inherent degree of uncertainty that may be attributed to any quantitative comparison, value, measurement, or other representation. It is also utilized to represent the degree by which a quantitative representation may vary from a stated reference without resulting in a change in the basic function of the subject matter at issue.

For the purposes of describing and defining the present invention it is noted that the term "device" is utilized herein to represent a combination of components and individual components, regardless of whether the components are combined with other components. For example, a device according to the present invention may comprise a battery or related source of electric power that in turn may be used to provide motive power. A device may also refer to a vehicle incorporating the source of motive power or other equipment that may make up, or be used in conjunction with, the vehicle or source of motive power; the nature of the device will be clear from the context. Furthermore, variations on the terms "automobile", "automotive", "vehicular" or the like are meant to be construed generically unless the context dictates otherwise. As such, reference to an automobile will be understood to cover cars, trucks, buses, motorcycles and other similar modes of transportation unless more particularly recited in context Likewise, the invention may be used in conjunction with battery cells unrelated to automotive applications, where temperature-sensitive equipment may need added thermal protection; such additional configurations are understood as being within the scope of the present invention.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A modular assembly for an automotive battery pack, said assembly configured to be secured to a primary support structure in said battery pack and comprising:
a pair of upstanding brackets spaced apart from one another along a bracket axis, each of said brackets defining a channel in at least one lateral end edge thereof;
a plurality of end plates formed along an end plate axis which are slidably insertable into said bracket channels to form an interlocking box-like structure that defines a volume to accept a stacked placement of a plurality of battery cells therein, at least one of said end plates configured to move along said end plate axis in response to an expansion of said stacked placement of cells while substantially maintaining said box-like structure; and
at least one adapter plate cooperative with at least one of said brackets or at least one of said end plates to provide a securable connection to said primary support structure.

2. The assembly of claim 1, wherein each of respective surfaces formed within said defined volume by said brackets and said end plates defines a substantially planar shape.

3. The assembly of claim 1, wherein said channel is sized to permit said at least one end plate to move along its end plate axis relative to said brackets.

4. The assembly of claim 1, wherein said channel is substantially C-shaped.

5. An automotive battery pack comprising:
a plurality of battery cells;
a primary support structure; and
at least one modular assembly configured to secure said plurality of battery cells to said support structure, said at least one modular assembly comprising:
a pair of upstanding brackets spaced apart from one another along a bracket axis; each of said brackets including a channel formed along at least one lateral end edge thereof;
a plurality of end plates formed along an end plate axis which are slidably insertable into said bracket channels to form an interlocking box-like structure that defines a volume to accept a stacked placement of said plurality of battery cells therein, at least one of said end plates configured to move along said end plate axis in response to an expansion of said stacked placement while substantially maintaining said box-like structure; and
at least one adapter plate cooperative with at least one of said brackets or at least one of said end plates to provide a securable connection to said primary support structure.

6. The battery pack of claim 5, further comprising cooling conduit cooperative with at least one of said primary support structure and said modular assembly such that thermal communication is established between a heat exchange device and said plurality of battery cells.

7. The battery pack of claim 5, wherein said battery pack is shaped to provide a substantially conformal fit within at least one of an automotive body, frame or unibody platform.

8. The battery pack of claim 5, wherein said channel is sized to permit said at least one end plate to move along its end plate axis relative to said brackets.

9. The battery pack of claim 5, wherein said end plates define a lateral edge shaped to form a nested fit within said channel.

* * * * *